(12) United States Patent
He et al.

(10) Patent No.: US 9,417,991 B2
(45) Date of Patent: Aug. 16, 2016

(54) TRANSLATION VERIFICATION TESTING

(71) Applicant: International Business Machines Corporation, Armonk, NY (US)

(72) Inventors: Gu Yi He, Shanghai (CN); Hua Hong Wang, Shanghai (CN); Qiang Wang, Wuhan (CN); Chao Zheng, Shanghai (CN); Si Qi Zhong, Shanghai (CN); Xian Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 13/864,442

(22) Filed: Apr. 17, 2013

(65) Prior Publication Data

US 2013/0290933 A1    Oct. 31, 2013

(30) Foreign Application Priority Data

Apr. 27, 2012  (CN) .......................... 2012 1 0129161

(51) Int. Cl.
*G06F 9/44* (2006.01)
*G06F 11/36* (2006.01)

(52) U.S. Cl.
CPC ........ *G06F 11/3668* (2013.01); *G06F 11/3604* (2013.01)

(58) Field of Classification Search
CPC .......................... G06F 11/3688; G06F 11/3664
USPC ......................................................... 717/124
See application file for complete search history.

(56) References Cited

U.S. PATENT DOCUMENTS 6,311,151 B1    10/2001  Yamamoto et al.
6,334,210 B1 *  12/2001  Miura et al. .................. 717/128
(Continued)

FOREIGN PATENT DOCUMENTS

| CN | 101286132 | 10/2008 |
| CN | 101408849 | 4/2009 |
| CN | 101436128 | 5/2009 |
| JP | 4396994 | 10/2009 |

OTHER PUBLICATIONS

N. Kato, et al., "A Utility for Showing Program Integrated Information Changes between Versions in a Translation Verification Test," Universal Communication, 2008, ISUC '08, Second International Symposium on Dec. 15-16, 2008, pp. 330-337.

(Continued)

*Primary Examiner* — Li B Zhen
*Assistant Examiner* — Bradford Wheaton
(74) *Attorney, Agent, or Firm* — Cantor Colburn LLP; David Woycechowsky

(57) ABSTRACT

Embodiments of translation verification testing are provided. An aspect includes reading a symbol table and a syntax tree to which source code corresponds. Widget objects and widget object methods are obtained in the symbol table. The widget objects and widget object methods are organized into a widget structure tree according to a code calling order in the syntax tree. An index file corresponding to the source code is generated by using the symbol table, the widget structure tree and resource files, where the index file records relationships between the widget objects.

9 Claims, 4 Drawing Sheets

(56) References Cited

U.S. PATENT DOCUMENTS

| | | | |
|---|---|---|---|
| 6,829,760 B1* | 12/2004 | Bera | 717/142 |
| 7,152,222 B2 | 12/2006 | Kumhyr et al. | |
| 7,610,262 B2* | 10/2009 | Yoshida et al. | |
| 7,636,914 B1* | 12/2009 | Johnson | 717/143 |
| 2002/0165885 A1 | 11/2002 | Kumhyr et al. | |
| 2004/0088687 A1* | 5/2004 | Dalton et al. | 717/141 |
| 2006/0206905 A1* | 9/2006 | Werner | 719/330 |
| 2008/0195377 A1 | 8/2008 | Kato et al. | |
| 2012/0233445 A1* | 9/2012 | Zhang | 712/220 |
| 2013/0014093 A1* | 1/2013 | Lee | 717/142 |
| 2013/0104100 A1* | 4/2013 | Mueller | G06F 9/44 717/106 |

OTHER PUBLICATIONS

K. Naotaka, et al., String Resource ID for Translation Verificatin Test, Joho Shori Gakkai Kenkyu Hokoku Journal Code: Z0031B ISSN: 0919-6072, vol. 2004, retrieved from the Internet: http://sciencelinks.jp/j-east/article/200419/000020041904A0615216.php, Jan. 12, 2012, 2 pages.

Unique Resource ID for Translation Verification Test (TVT), IPCOM, Disclosure No. IPCOM000033940D dated Jan. 6, 2005, 1 page.

* cited by examiner

TRANSLATION VERIFICATION TESTING

PRIORITY

The present application claims priority to China Patent Application No. 201210129161.1, filed on 27 Apr. 2012, and all the benefits accruing therefrom under 35 U.S.C. §119, the contents of which in its entirety are herein incorporated by reference.

BACKGROUND

This disclosure relates generally relate to testing, and particularly, to translation verification testing.

Translation Verification Testing (TVT) plays an important role in globalization and localization projects. Text resources in globalization and localization are always stored in separate resource files, and since they may be applied in different contexts, it is difficult to determine whether the translation of these text resources is correct, or whether it is proper in the context of the environment in which the system is running. Currently, there are two methods for translation verification testing. The first method is to translate the texts in the text resources one by one. However, since a word may have different meanings in different contexts, without context, it is difficult for translators and testers to determine whether the translation of the word is correct or proper. The second method is to run the application, and to perform translation and verification during the running. However, performing translation and verification during the running requires that testers must be familiar with the application, which usually requires testers to be trained. Even so, since it is difficult to achieve complete coverage, the accuracy of translation is still hard to be guaranteed.

SUMMARY

Methods, systems, and computer program products for translation verification testing are provided. An aspect includes reading a symbol table and a syntax tree to which source code corresponds. Widget objects and widget object methods are obtained in the symbol table. The widget objects and widget object methods are organized into a widget structure tree according to a code calling order in the syntax tree. An index file corresponding to the source code is generated by using the symbol table, the widget structure tree and resource files, where the index file records relationships between the widget objects.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments will be described in detail with reference to the accompanying drawings in which the embodiments of the present disclosure have been illustrated. However, the present disclosure can be implemented in various manners, and thus should not be construed to be limited to the embodiments disclosed herein. To the contrary, embodiments are provided for thorough and complete understanding of the present disclosure, and completely conveying the scope of the present disclosure to those skilled in the art.

According to an embodiment, there is provided a method for Translation Verification Testing (TVT), comprising: reading a symbol table and a syntax tree to which source code corresponds; obtaining widget objects and widget object methods in the symbol table; organizing the widget objects and widget object methods into a widget structure tree according to the code calling order in the syntax tree; generating an index file corresponding to the source code by using the symbol table, the widget structure tree and resource files, wherein the index file records relationships between the widget objects.

According to another embodiment, there is provided a system for Translation Verification Testing, comprising: a widget parser, configured to read a symbol table and a syntax tree to which source code corresponds; obtain widget objects and widget object method in the symbol table; organize the widget objects and widget object methods into a widget structure tree according to the code calling order in the syntax tree; a parameter parser, configured to: generate an index file corresponding to the source code according to the symbol table, the widget structure tree and resource file, wherein the index file records relationships between the widget objects.

Figure 1:
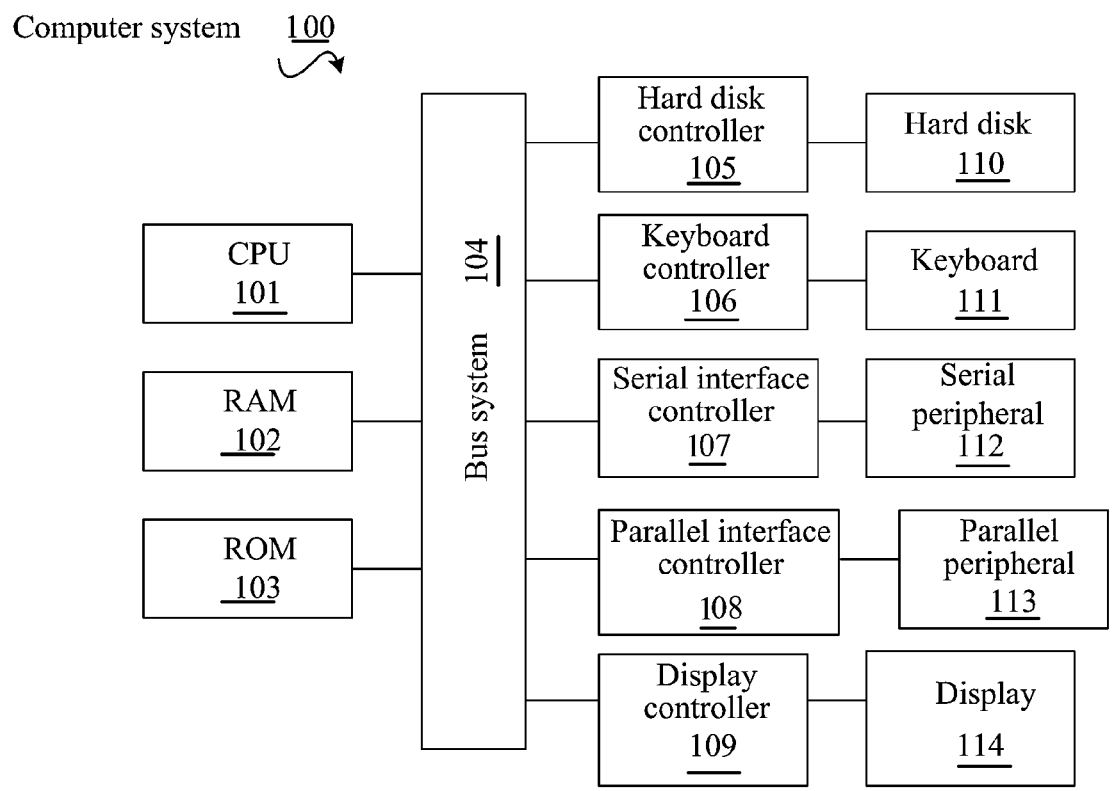
FIG. 1 shows an exemplary computer system 100 which is applicable to implement embodiments.

FIG. 1 shows an exemplary computer system 100 which is applicable to implement various embodiments. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for exemplary purposes. In some cases, some devices may be added to or removed from the computer system 100 based on specific situations.

Various embodiments may comprise a system, method or computer program product. Accordingly, some embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for various embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments mainly use a translation framework based on a widget context. A widget is a usable GUI graphic component, wherein some data are encapsulated, and some APIs are provided to enable a program to operate the component. Common widgets include: Java Swing components, SWT components, Windows local GUI graphical components, Dojo GUI graphical components, etc. The translation framework based on a widget context first parses the source code to obtain the corresponding symbol table and syntax tree, then obtains the widget objects and widget object methods in the symbol table, and organizes the widget objects and widget object methods into a widget structure tree according to the code calling order in the syntax tree. An index file is then generated corresponding to the source code by using the symbol table, the widget structure tree and resource files, where the index file records relationships between the widget objects. When translation verification testing is performed, the generated index file is read and a context is provided for sentences or a word to be translated according to the relationships between the widget objects recorded in the index file, so that the translator is enabled to perform accurate translation, and the tester can also accurately verify whether the translation is correct or proper. However, it should be understood that although described herein as using the method during translation verification testing, the method can be used in any phase of translation verification testing.

Usually, a widget is composed of a plurality of widget objects, and a widget object has corresponding translation units (usually corresponding to message keywords in a resource file). According to the relationships between translation units, the relationships are divided between a plurality of widget objects into two types: strong correlation and weak correlation. If a complete sentence is composed of a plurality of translation units, and the plurality of translation units constituting the complete sentence are stored separately, since the plurality of translation units stored separately need to be translated as a whole, the relationships between these translation units are strong correlation; meanwhile, the relationships between the plurality of widget objects to which these translation units correspond are also strong correlation. If a plurality of translation units appear in the same context, e.g., "save" and "open" are both under the "File" menu, then the relationship between these translation units is weak correlation; meanwhile, the relationship between the plurality of widget objects to which these translation units correspond are also weak correlation.

Figure 2:
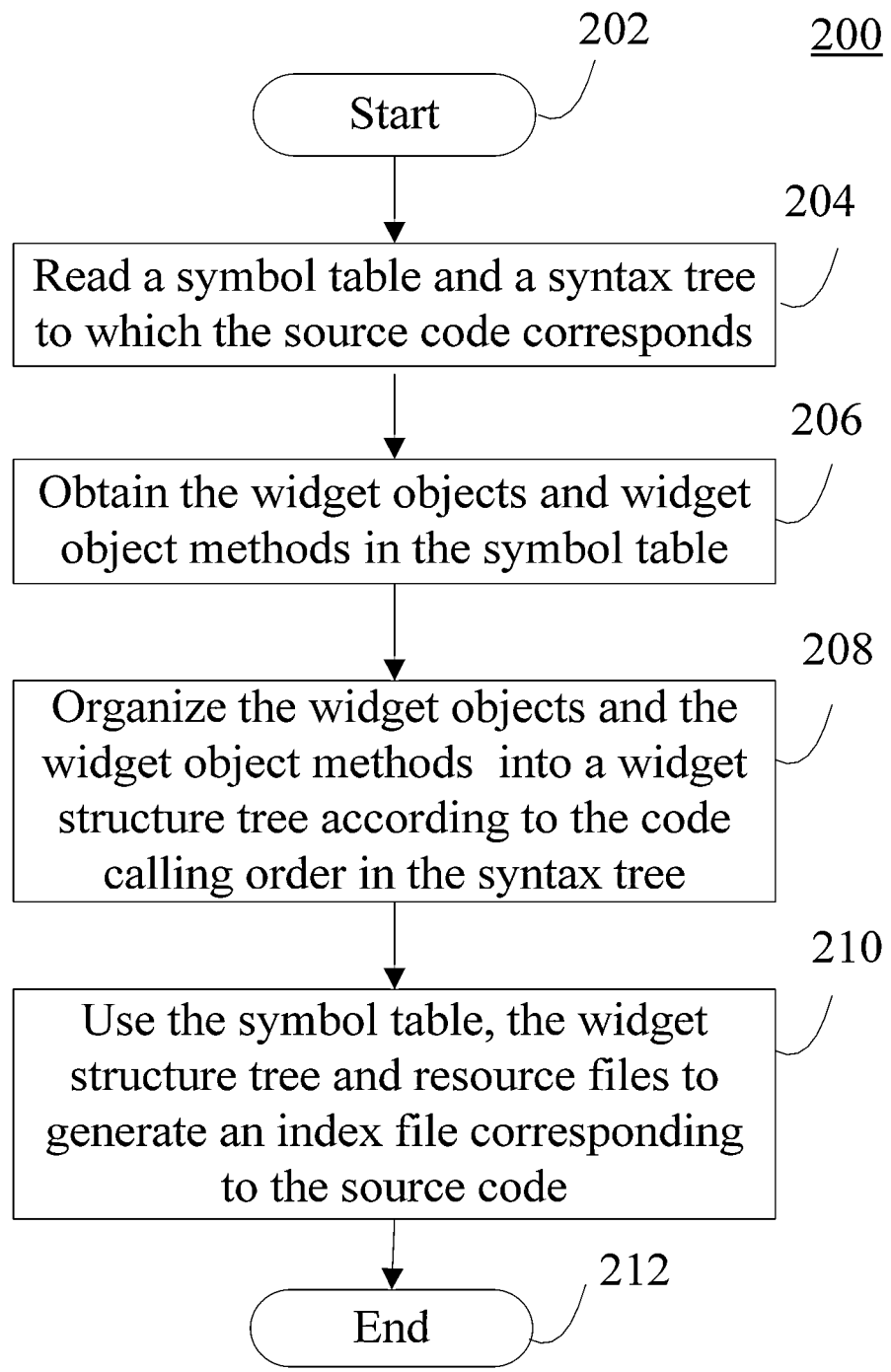
FIG. 2 shows a flow chart of a method 200 for translation verification testing according to an embodiment.

Now referring to FIG. 2, a flow chart is depicted of a method 200 for translation verification testing according to an exemplary embodiment. As shown in FIG. 2, the method 200 for translation verification testing starts from block 202. Next, the method 200 proceeds to block 204, where a symbol table and a syntax tree to which the source code corresponds are read. The symbol table and the syntax tree are usually generated by performing semantic analysis on the source code.

How to perform semantic analysis to obtain the symbol table and the syntax tree is known in the art, and is not repeated here. The symbol table comprises information on elements appearing in the source code, the types of the elements (which may be class, method, object, etc.), the classes to which they belong, etc. The syntax tree records the calling order of the entire code, and all the variables, names of the methods involved in the syntax tree can be find corresponding values in the symbol table. Taking the following code as an example:

```
Dialog d=new Dialog( );
d.setTitle(getResouce(dTitleKey))
Menu m=new Menu( );
m.setText(getResouce(mTextKey))
MenuItem miA=new MenuItem( );
miA.setText(getResouce(miATextKey))
MenuItem miB=new MenuItem( );
miB.setText(getResouce(miBTextKey))
ToolBar tb=new ToolBar( );
tb.setText(getResouce(tbTextKey))
tb.setLabel(getResouce(tbLabelKey))
d.addChild(m);
m.addChild(miA);
m.addChild(miB);
d.addChild(tb)
```

The symbol table obtained by performing semantic analysis on the above source code is as shown in the following Table 1.

TABLE 1

| Type | Name | Belonging Class |
|------|------|-----------------|
| class | Dialog | |
| class | Menu | |
| class | MenuItem | |
| class | ToolBar | |
| method | setTitle | Dialog |
| method | setTitle | Menu |
| method | setTitle | MenuItem |
| method | setTitle | ToolBar |
| method | setLabel | ToolBar |
| method | getResource | System |
| method | addChild | Dialog |
| method | addChild | Menu |
| object | d | Dialog |
| object | m | Menu |
| object | miA | MenuItem |
| object | miB | MenuItem |
| object | tb | ToolBar |
| object | dTitleKey | String |
| object | mTextKey | String |
| object | miATextKey | String |
| object | miBTextKey | String |
| object | tbTextKey | String |
| object | tbLabelKey | String |

Figure 4:
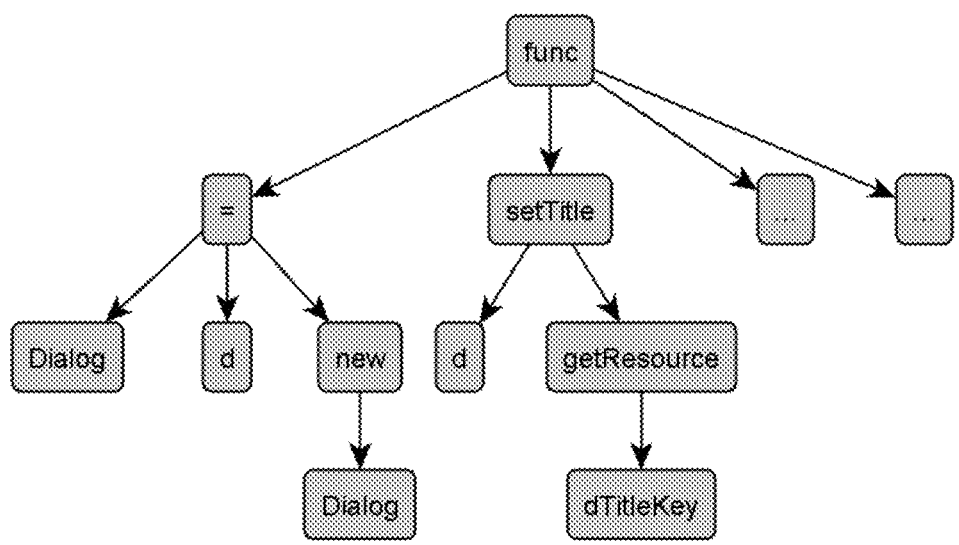
FIG. 4 shows an example of a syntax tree.

Since the syntax tree records the calling order of the entire code, it is usually large, and here only the syntax tree corresponding to the first two rows of code is exemplarily shown in FIG. 4. The symbol table of Table 1 and the syntax tree of FIG. 4 are only given as an example.

Next, the method 200 proceeds to block 206, where the widget objects and widget object methods in the symbol table are obtained. According to an embodiment, first all the objects in the symbol table are obtained, then for each object, it is determined whether the class to which the object belongs is a widget class. If the class to which the object belongs is a widget class, the object is determined as a widget object. Those methods corresponding to the widget objects are widget object methods, which may include, for example, a set method such as setTilte, SetText, or may include methods using getResource( ) as parameters, etc.

Taking Table 1 as an example, the objects therein can be obtained: d, m, miA, mi, tb, dTitleKey, mTextKey, miATextKey, miBTextKey, tbTextKey, tbLabelKey. Then, for each object, it is determined whether the class to which the object belongs is a widget class. For example, for object d, the class to which it belongs, Dialog, is a widget class, and thus object d is determined as a widget object. Still for example, for object dTitleKey, the class to which it belongs, String, is not a widget class, and thus object dTitleKey is determined as a non-widget object. Through the above process, all the widget objects in the symbol table can be obtained as follows: d, m, miA, miB and tb. And the methods corresponding to these widget objects, i.e., widget object methods, are: setTitle, setLabel, getResource and addChild.

Although above is described first obtaining all the objects in the symbol table, then for each object, determining whether the class to which the object belongs is a widget class to further determine whether the object is a widget object in conjunction with the example of Table 1, other methods may be used to achieve the objective of obtaining the widget objects in the symbol table, e.g., by first obtaining all the widget classes in the symbol table, then obtaining the objects related thereto according to the widget classes so as to obtain the widget objects. The above description is only exemplary.

Next, the method 200 proceeds to block 208, where the widget objects and the widget object methods are organized into a widget structure tree according to the code calling order in the syntax tree. The widget structure tree comprises various widget objects and the relationships therebetween. In the finally formed widget structure tree, there are four kinds of relationships between widget objects: sibling node relationship, parent node relationship, child node relationship or oneself. In the following an illustration will be given by still using the above given code as an example; but it needs to be emphasized that here the illustration is merely exemplary.

For the above given code, first the syntax tree is traversed according to the code execution order. During the traversing process:

1) For a widget object method for building a widget, e.g., a method like addChind, etc., the caller, the callee and the appearance order are recorded. Thereafter, a widget structure tree is constructed by using the recorded caller, the callee and the appearance order. Still taking the above code as an example, after the traversal is accomplished, the following structure can be constructed:

```
<DialogSample>
    <MainMenu>
        <MenuItemA/>
        <MenuItemB/>
    </MainMenu>
    <ToolBar/>
</DialogSample>
```

2) For a set method, e.g., widget object methods like setText, setLabel, etc., the caller and the name of the corresponding set method are recorded. Thereafter, the recorded caller and the name of the corresponding set method are added to the above generated widget structure tree to improve the widget structure tree. Still using the above code as an example, after the transversal is accomplished, the widget structure tree can be further improved on the basis of above 1) to get the following structure:

```
<DialogSample setMethod="setTitle">
    <MainMenu setMethod="setText">
        <MenuItemA setMethod="setText"/>
        <MenuItemB setMethod="setText"/>
    </MainMenu>
    <ToolBar setMethod="setLabel, setText"/>
</DialogSample>
```

Next, the method 200 proceeds to block 210, where the symbol table, the widget structure tree and resource files are used to generate an index file corresponding to the source code, where the index file records the relationships between the widget objects. According to an embodiment, first the symbol table, the widget structure tree and resource files are used to obtain the correlation between the widget objects; then according to the correlation between the widget objects, an index file corresponding to the source code is generated. The following description explains how to obtain the correlation between the widget objects by using the symbol table, the widget structure tree and the resource files. It should be understood that the following one or more embodiments are only exemplary.

According to an embodiment, first all the set methods in the symbol table, i.e., the widget object methods that can set by using message keywords in the resource files, e.g., setTitle( ), setLabel( ), etc., are obtained. Then, the parameters in the set method are statically parsed, and the parameters are used to trace message keywords in resource files, usually Resource-Bundle. The following description explains how to use the parameters in the set method to trace message keywords in the resource files in conjunction with different embodiments and for different conditions respectively.

According to an embodiment, if the parameter in the set method is the character string linked with a message keyword, that is to say, the message keyword can be traced in the resource file, then the set method is recorded as successfully matching the message keyword. For example, for the method setTitle(getResource(keyA)), the parameter getResource (keyA) therein is linked with the message keyword KeyA, that is to say, if the message keyword KeyA can be traced in the resource file, the set method is recorded as successfully matching keyA.

According to an embodiment, if the parameter in the set method is a character string linked with serial message keywords, then tracing is performed respectively for the respective parts of the serial message keywords. If some part of the serial message keywords can finally be traced to a character string constant, then the set method is recorded as successfully matching the part of the serial message keywords. If some part cannot be traced finally to a character string constant, then the part of the serial message keywords is labeled as a wildcard. For example, for the method:
setTitle(getResource(keyA+untraceable)),
where the parameter getResource (keyA+untraceable) is linked with serial message keywords keyA+untraceable, then tracing is performed for the various parts of the serial message keywords, and finally keyA can be traced to a character string constant, while "untraceable" cannot be traced to a character string constant. Therefore, the set method is recorded as successfully matching all message keywords beginning with keyA.

According to an embodiment, if the parameter in the set method is a message series, tracing is performed for the respective parts of the message series, and the respective message keywords obtained by the tracing of the respective parts of the message series are recorded. Then, the set method is recorded as successfully matching the obtained respective message keywords. Meanwhile, strong correlation between the respective message keywords is recorded. For example, for the set method:
setTitle(getResource(keyA)+getResource(keyB)),
where the parameter getResource(keyA)+getResource (keyB) is a message series, and tracing is performed for the respective parts of the message series to obtain the message keywords, keyA and KeyB. Then the set method is recorded as successfully matching keyA and keyB, and strong correlation between keyA and keyB is recorded.

Through the above processing, the parameters in the set method are used to trace message keywords in the resource file, while at the same time correlation between the message keywords is also obtained. Since the message keywords correspond to the translation units mentioned previously and the translation units correspond to widget objects, the correlation between the message keywords also reflects the correlation between the widget objects.

Next, according to an embodiment, correlation between the widget objects is detected by using the widget structure tree. The correlation between the widget objects can further be detected by the widget structure tree. For example, this can be realized by respectively substituting the method names and the classes to which they belong into the widget structure tree to double loop through all the set methods. If they are correlated, the successfully matching two sets of message keywords in the set method are recorded as correlated. For example, the widget structure tree indicates that ClassA.methodA is correlated to ClassB.method B, while keyA and keyB are recorded as successfully matching ClassA.methodA, and keyC and keyD are recorded as successfully matching ClassB.methodB, and then the following four sets of correlation can further be obtained: KeyA and keyC, keyA and keyD, keyB and keyC, and keyB and keyD. Through the above processing, more comprehensive correlation between the widget objects can be obtained.

According to an embodiment, an index file corresponding to the source code is generated by using the above obtained correlation between the widget objects, and the index file records the correlation between the widget objects. With the index file, when TVT testers perform item-by-item translation with reference to the resource files, by reading the contents of the index file, the translation units of strong correlation and of weak correlation corresponding to the current translation units are presented in real time, so that TVT testers can refer to the context to improve the correctness of translation.

Figure 3:
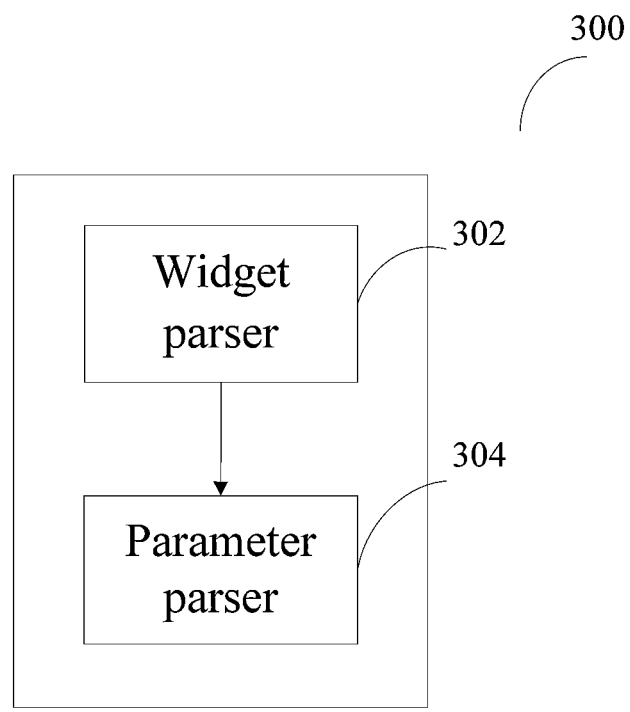
FIG. 3 shows a block diagram of a system 300 for translation verification testing according to an embodiment.

Now referring to FIG. 3, it shows a block diagram of a system 300 for translation verification testing according to an embodiment. The system 300 comprises a widget parser 302, configured to: read a symbol table and a syntax tree to which source code corresponds; obtain widget objects and widget object method in the symbol table; organize the widget objects and widget object methods into a widget structure tree according to the code calling order in the syntax tree; a parameter parser 304, configured to: generate an index file corresponding to the source code according to the symbol table, the widget structure tree and the resource file, where the index file records relationships between the widget objects.

According to an embodiment, the symbol table and the corresponding syntax tree are generated by performing semantic analysis on the source code. According to an embodiment, the widget parser 302 is further configured to: traverse the syntax tree according to the code execution order. According to an embodiment, the widget parser 302 is further configured to perform: for a method of building a widget, record the caller, the callee and the appearance order. For a set method, record the caller and the name of the corresponding set method.

According to an embodiment, the parameter parser 304 is further configured to: statically parse the parameters of the widget objects; according to the symbol table, trace message keywords in the resource file by using the parameters of the widget object method; detect correlation between the widget objects by using the widget tree structure; generate an index file corresponding to the source code by using the parameters of the widget object methods, the message keywords, and the correlation between the widget objects.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for translation verification testing, comprising:
    reading, by a computer system, a symbol table and a syntax tree to which source code corresponds, wherein the symbol table and the syntax tree to which the source code corresponds are generated by performing semantic analysis on the source code;
    obtaining, by the computer system, widget objects and widget object methods in the symbol table;
    organizing, by the computer system, the widget objects and widget object methods into a widget structure tree according to a code calling order in the syntax tree by recording a caller, a callee and an appearance order of the widget object methods in the widget tree structure as the syntax tree is traversed, and establishing parent, child, and sibling node relationships between the widget objects in the widget tree structure; and
    generating, by the computer system, an index file corresponding to the source code by using the symbol table, the widget structure tree and resource files, wherein the index file records relationships between the widget objects, and the generating further comprises:
        statically parsing parameters of the widget object methods;
        tracing message keywords in the resource files by using the parameters of the widget object methods and according to the symbol table;
        detecting correlation between the widget objects by using the widget tree structure; and
        generating the index file corresponding to the source code by using the parameters of the widget object methods, the message keywords and the correlation between the widget objects.

2. The method of claim 1, wherein organizing the widget objects and the widget object methods into the widget structure tree according to the code calling order in the syntax tree comprises traversing the syntax tree according to a code execution order.

3. The method of claim 2, further comprising:
    for a set method, recording a name of a corresponding set method in the widget tree structure.

4. A system for translation verification testing, comprising:
    a widget parser, configured to:
        read a symbol table and a syntax tree to which source code corresponds, wherein the symbol table and the corresponding syntax tree are generated by performing semantic analysis on the source code;
        obtain widget objects and widget object methods in the symbol table; and
        organize the widget objects and widget object methods into a widget structure tree according to a code calling order in the syntax tree by recording a caller, a callee and an appearance order of the widget object methods in the widget tree structure as the syntax tree is traversed, and establishing parent, child, and sibling node relationships between the widget objects in the widget tree structure; and
    a parameter parser, configured to:
        generate an index file corresponding to the source code according to the symbol table, the widget structure tree and resource files, wherein the index file records relationships between the widget objects, and the parameter parser is further configured to:
            statically parse parameters of the widget object methods;
            trace message keywords in the resource files by using the parameters of the widget object methods and according to the symbol table;
            detect correlation between widget objects by using the widget tree structure; and
            generate the index file corresponding to the source code by using the parameters of the widget object method, the message keywords and the correlation between the widget objects.

5. The system of claim 4, wherein the widget parser is further configured to:
    traverse the syntax tree according to a code execution order.

6. The system of claim 5, wherein the widget parser is further configured to:
    for a set method, record a name of the corresponding set method in the widget tree structure.

7. A computer program product for translation verification testing, the computer program product comprising:
    a computer readable storage medium having computer readable program code embodied therewith, the computer readable program code configured to:
        read a symbol table and a syntax tree to which source code corresponds, wherein the symbol table and the corresponding syntax tree are generated by performing semantic analysis on the source code;

obtain widget objects and widget object methods in the symbol table;

organize the widget objects and widget object methods into a widget structure tree according to a code calling order in the syntax tree by recording a caller, a callee and an appearance order of the widget object methods in the widget tree structure as the syntax tree is traversed, and establishing parent, child, and sibling node relationships between the widget objects in the widget tree structure; and generate an index file corresponding to the source code according to the symbol table, the widget structure tree and resource files, wherein the index file records relationships between the widget objects, and the computer readable program code is further configured to:

statically parse parameters of the widget object methods;

trace message keywords in the resource files by using the parameters of the widget object methods and according to the symbol table;

detect correlation between widget objects by using the widget tree structure; and generate the index file corresponding to the source code by using the parameters of the widget object method, the message keywords and the correlation between the widget objects.

8. The computer program product of claim 7, wherein the computer readable program code is further configured to traverse the syntax tree according to a code execution order.

9. The computer program product of claim 8, wherein the computer readable program code is further configured to:

for a set method, record a name of the corresponding set method in the widget tree structure.

* * * * *